United States Patent
Ono et al.

(10) Patent No.: US 11,880,225 B2
(45) Date of Patent: Jan. 23, 2024

(54) HOST DEVICE, SLAVE DEVICE, AND DATA TRANSFER SYSTEM

(71) Applicant: Panasonic Intellectual Property Management Co., Ltd., Osaka (JP)

(72) Inventors: Tadashi Ono, Osaka (JP); Isao Kato, Osaka (JP); Takuji Maeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 77 days.

(21) Appl. No.: 17/841,054

(22) Filed: Jun. 15, 2022

(65) Prior Publication Data

US 2022/0308893 A1 Sep. 29, 2022

Related U.S. Application Data

(63) Continuation of application No. PCT/JP2021/046255, filed on Dec. 15, 2021.

(30) Foreign Application Priority Data

Feb. 16, 2021 (JP) ................................. 2021-022560

(51) Int. Cl.
*G06F 1/06* (2006.01)
*G06F 9/4401* (2018.01)
*G06F 1/3215* (2019.01)

(52) U.S. Cl.
CPC .............. *G06F 9/4403* (2013.01); *G06F 1/06* (2013.01); *G06F 1/3215* (2013.01)

(58) Field of Classification Search
None
See application file for complete search history.

(56) References Cited

U.S. PATENT DOCUMENTS

| | | | |
|---|---|---|---|
| 11,481,124 B2* | 10/2022 | Choe | G06F 3/0619 |
| 11,487,341 B2* | 11/2022 | Naik | G06F 1/324 |
| 2003/0046238 A1* | 3/2003 | Nonaka | H04L 9/083 |
| | | | 380/282 |
| 2004/0250057 A1* | 12/2004 | Fujita | G06F 9/4406 |
| | | | 713/1 |
| 2007/0168652 A1 | 7/2007 | Mylly et al. | |
| 2016/0188245 A1* | 6/2016 | Thadi Suryaprakash | |
| | | | G06F 1/3296 |
| | | | 710/13 |
| 2019/0373558 A1* | 12/2019 | Heo | G06F 1/32 |
| 2020/0035289 A1* | 1/2020 | Fujimoto | G06F 13/4081 |

FOREIGN PATENT DOCUMENTS

| | | |
|---|---|---|
| JP | 2009-524139 | 6/2009 |
| JP | 2015-62131 | 4/2015 |
| JP | 2016-46781 | 4/2016 |
| WO | 2007/083179 | 7/2007 |

OTHER PUBLICATIONS

International Search Report dated Mar. 1, 2022 in corresponding International Application No. PCT/JP2021/046255.

* cited by examiner

*Primary Examiner* — Phil K Nguyen
(74) *Attorney, Agent, or Firm* — Wenderoth, Lind & Ponack, L.L.P.

(57) ABSTRACT

A slave device continuously transmits a plurality of tuning blocks to a host device at intervals defined by a clock period between a plurality of data blocks at the time of transmitting the plurality of data blocks and by a clock period defined by a data structure of the plurality of tuning blocks.

6 Claims, 8 Drawing Sheets

HOST DEVICE, SLAVE DEVICE, AND DATA TRANSFER SYSTEM

TECHNICAL FIELD

The present disclosure relates to a host device, a slave device, and a data transfer system formed by these devices.

BACKGROUND ART

In recent years, as a storage medium (slave device), a secure digital (SD) card (registered trademark), Compact-Flash (registered trademark), and the like have become widespread. The slave device forms a data transfer system by being connected to a host device such as a personal computer or a camera, and data is transmitted and received in the data transfer system.

PTL 1 discloses a technique for enabling a user to use a slave device as a bootable medium.

Further, when the frequency of a clock signal increases as an access speed between the host device and the slave device increases, the host device needs to adjust punching timing of data transmitted from the slave device. In particular, in a case where the host device is connected to an SD card, which is a detachable slave device by ultra high speed-1 (UHS-I) which is a high-speed bus standard, the punching timing varies depending on a peripheral environment such as a temperature, and individual variations in the host device and the SD card, and combinations of the host device and the SD card are infinite. Therefore, unless the punching timing is adjusted between the combined SD card and host device every time of activation, data cannot be correctly acquired. Adjustment of the punching timing is also referred to as "tuning".

PTL 2 discloses a technique for tuning between a slave device and a host device.

CITATION LIST

Patent Literature

PTL 1: Unexamined Japanese Patent Publication No. 2015-62131
PTL 2: Unexamined Japanese Patent Publication No. 2016-46781

SUMMARY OF THE INVENTION

In order to enable a host device to correctly receive boot data from an SD card as a bootable medium by using the UHS-I based on the technique described in PTL 1, it is necessary to perform tuning before reception of the boot data.

On the other hand, in the technique described in PTL 2, in order to perform tuning, the host device issues a predetermined tuning command and receives a tuning block including fixed data from the SD card.

However, in boot data acquisition based on the technique described in PTL 1, the host device needs to drive a signal line for transmitting and receiving commands of a boot start instruction through completion of boot data transfer to a low level. Therefore, a method for issuing a tuning command to acquire a tuning block described in PTL 2 cannot be used.

The present disclosure provides a data transfer system capable of acquiring a tuning block while driving a signal line for transmitting and receiving a command to a low level.

A data transfer system of the present disclosure is a data transfer system including a slave device and a host device connected to the slave device via at least a power supply line, a clock line, a command line, and a data line.

The host device supplies a power to the slave device via the power supply line after being connected to the slave device. The host device supplies a first clock having a first frequency and a first voltage value to the slave device via the clock line. The host device drives the command line at a high level to a low level. The host device stops the supply of the first clock. The host device supplies a second clock having a second frequency and a second voltage value to the slave device via the clock line in a state where the data line is driven to a low level.

The slave device drives the data line to a high level within a first predetermined period after the supply of the second clock, and transmits a plurality of tuning blocks from the slave device to the host device via the data line within a second predetermined period after an interval of at least a third predetermined period.

The host device performs tuning for adjusting punching timing by using the plurality of tuning blocks received via the data line.

The host device receives boot data from the slave device via the data line, and is activated by using the received boot data.

The present disclosure can provide a data transfer system capable of acquiring a tuning block while driving a signal line for transmitting and receiving a command to a low level.

DESCRIPTION OF EMBODIMENT

An exemplary embodiment will be described in detail below with reference to the drawings as appropriate. However, unnecessarily detailed descriptions may be omitted. For example, detailed description on already known matters and duplicated description on substantially identical configurations may be omitted. This is to avoid unnecessary redundancy in the following description and to facilitate understanding of those skilled in the art.

Note that the inventor of the present disclosure provides the accompanying drawings and the following description in order to allow those skilled in the art to fully understand the present disclosure, and does not intend to limit the subject matter as described in the appended claims.

1. Configuration of Data Transfer System

Figure 1:
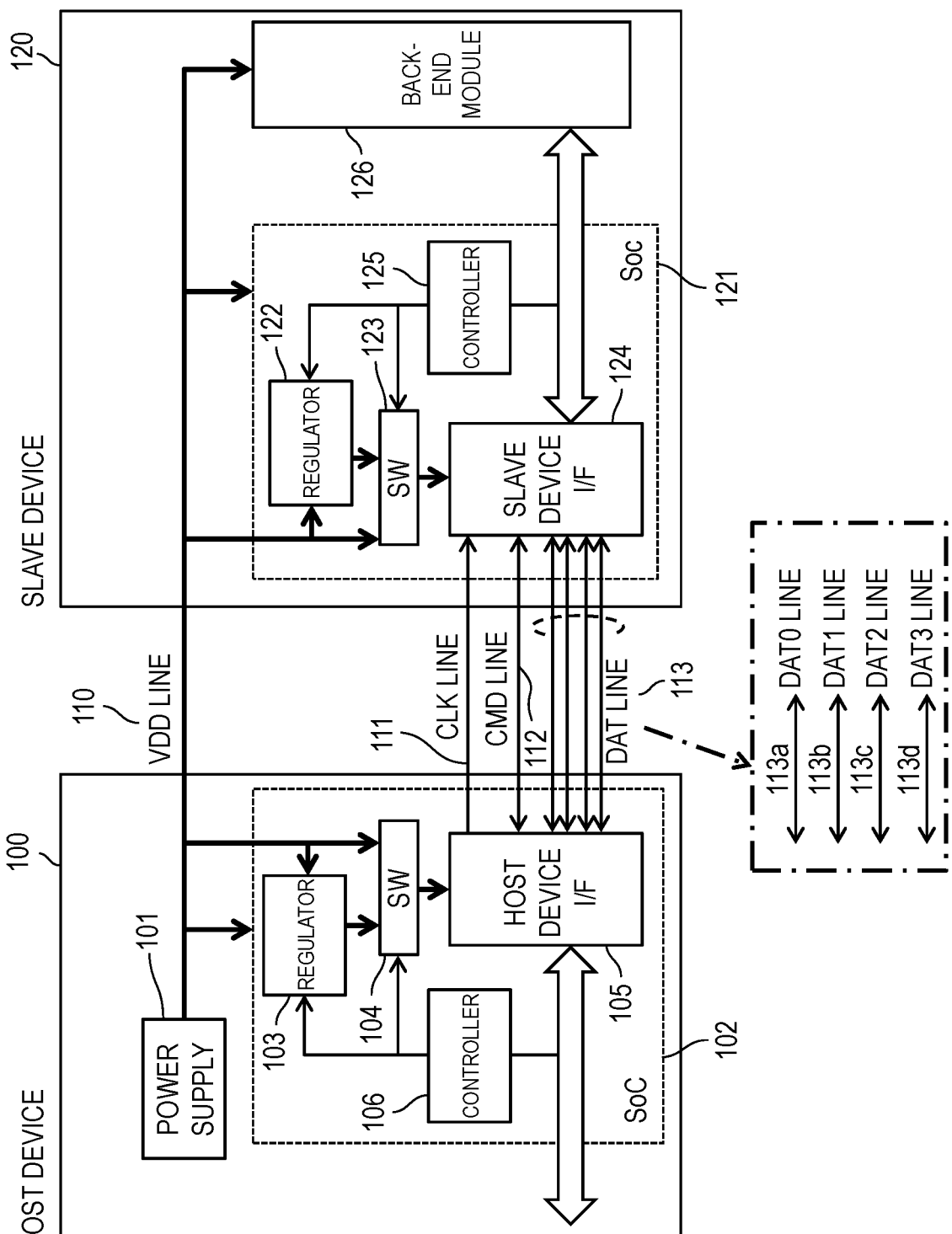
FIG. 1 is a block diagram illustrating a configuration of a data transfer system in which a slave device is connected to a host device.

FIG. 1 is a block diagram illustrating a configuration of a data transfer system in which slave device 120 is connected to host device 100. As illustrated in FIG. 1, host device 100 includes at least power supply 101 and system-on-chip (SoC) 102. SoC 102 includes at least regulator 103, SW 104 that is an electrical switch for selecting one of two power inputs, host device interface (I/F) 105, and controller 106. Note that regulator 103 can also be disposed outside SoC 102.

Host device 100 and slave device 120 are mechanically connected. Host device 100 is electrically connected to slave device 120 via VDD line 110 that is a 3.3 V power supply line.

Slave device 120 includes at least SoC 121 and back-end module 126. Back-end module 126 refers to a recording medium such as a flash memory, or a device such as a wireless communication module. SoC 121 includes at least regulator 122, SW 123, slave device I/F 124, and controller 125. Note that regulator 122 can also be disposed outside SoC 121. In the present exemplary embodiment, a secure digital (SD) card is used as an example of slave device 120. However, slave device 120 is not limited to the SD card. A compact flash (registered trademark) and a memory stick (registered trademark) are also examples of slave device 120.

Host device I/F 105 and slave device I/F 124 perform signal communication via lines including clock (CLK) line 111, command (CMD) line 112, and data (DAT) line 113. DAT line 113 includes four signal lines: DAT0 line 113a; DAT1 line 113b; DAT2 line 113c; and DAT3 line 113d.

2. Operation of Data Transfer System

Hereinafter, a transfer operation of a tuning block and boot data executed when slave device 120 is connected to host device 100 will be described with reference to FIGS. 1 to 3.

Note that, in the present description, a signal being at a low level means that a voltage of the signal is 0 V or in the vicinity thereof. On the other hand, a signal being at a high level means that the signal has a higher voltage than at a low level and can easily be distinguished from the low-level signal. A voltage value representing the high level can be defined in accordance with the use of the data transfer system. In the present exemplary embodiment, a high voltage signal of 3.3 V and a low voltage signal of 1.8 V are used as examples of the voltage value representing the high level.

Figure 2:
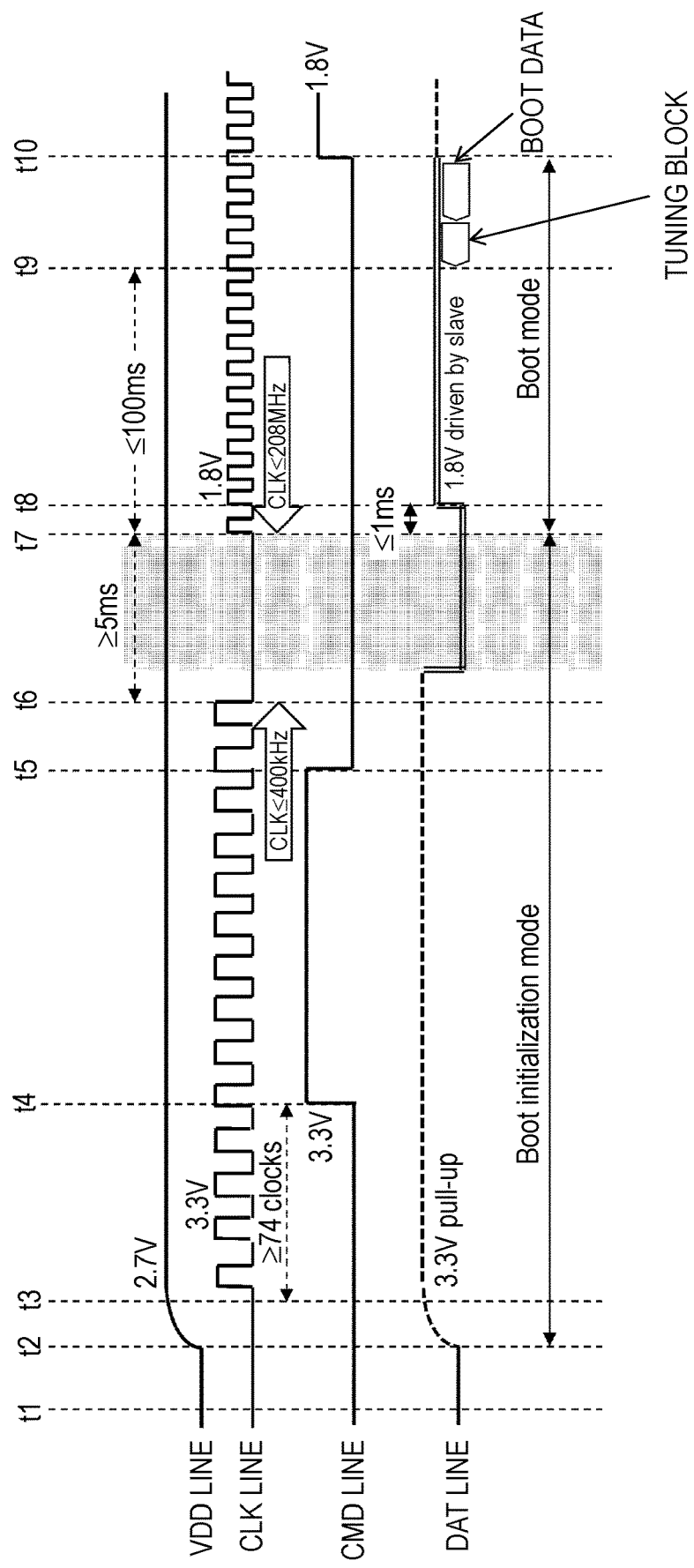
FIG. 2 is a schematic diagram of timing after power activation in the host device and the slave device.

FIG. 2 is a schematic diagram of a timing chart after power activation in host device 100 and slave device 120.

Figure 3:
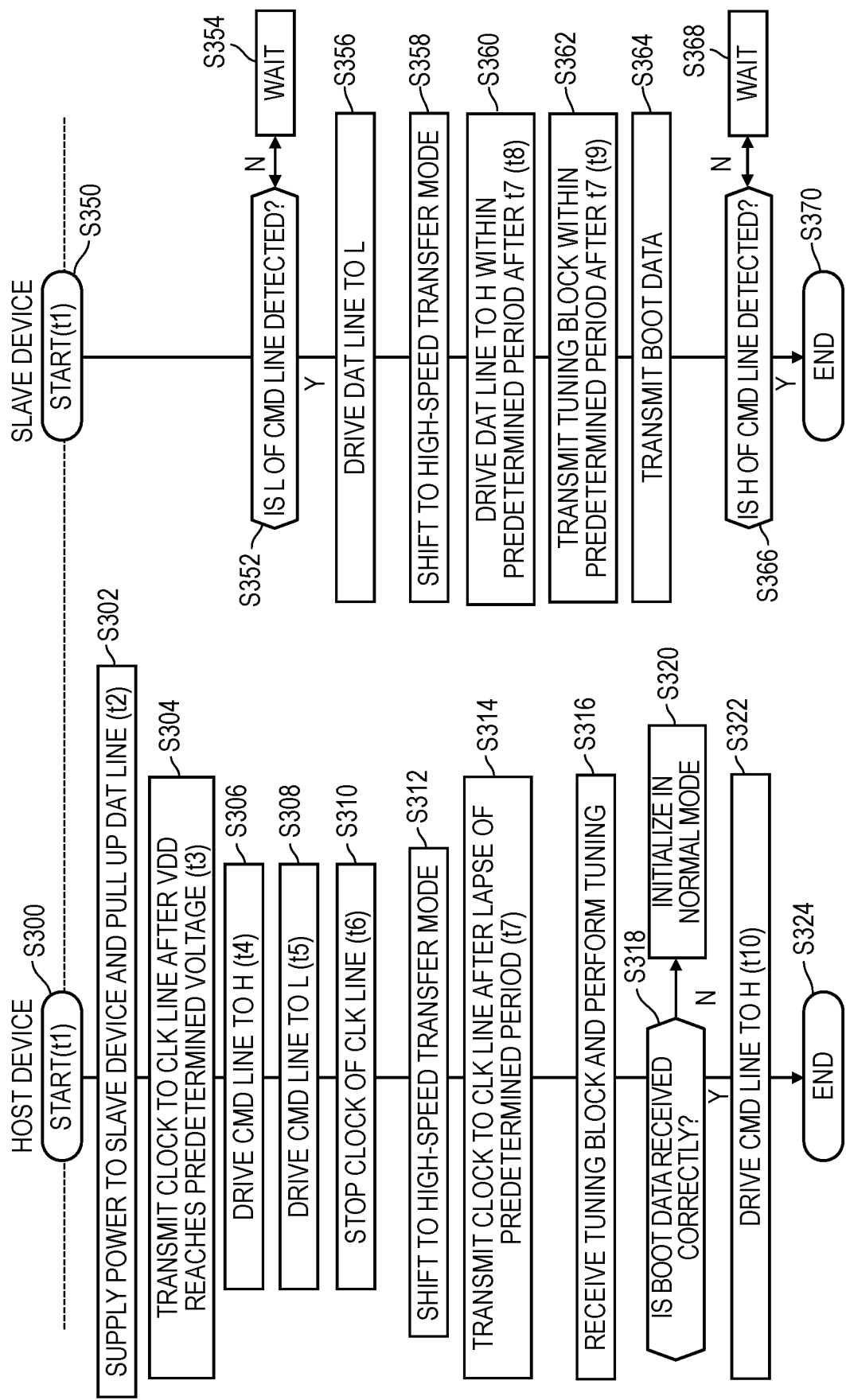
FIG. 3 is a schematic diagram of a sequence in the host device and the slave device.

FIG. 3 is a schematic diagram of a sequence in host device 100 and slave device 120.

Host device 100 starts an activating operation of slave device 120 at timing t1 at which slave device 120 is connected (S300, S350). Host device 100 supplies 3.3 V power from power supply 101 at timing t2. 3.3 V power is supplied to SoC 102, regulator 103, SW 104, and slave device 120 via VDD line 110. Host device 100 pulls up DAT line 113 to 3.3 V (3.3 V pull-up in FIG. 2) at timing t2 (S302).

After the voltage applied to VDD line 110 reaches 2.7 V at timing t3, host device 100 sends a first clock to CLK line 111 (S304). A frequency of the first clock is less than or equal to 400 KHz (first frequency). A voltage value of the first clock is 3.3 V (first voltage value).

Host device 100 drives CMD line 112 to the high level at timing t4 (S306) after sending the first clocks by a predetermined number of clocks (for example, 74 clocks or more), and drives CMD line 112 to the low level at timing t5 (S308) after timing t4.

Host device 100 stops sending the first clock to CLK line 111 at timing t6 subsequent to timing t5 (S310). This is an operation for sending a second clock to CLK line 111 in the future processing.

When not detecting that CMD line 112 is driven to the low level (N in S352), slave device 120 stands by until host device 100 sends a next instruction (S354).

When detecting that CMD line 112 is driven to the low level (Y in S352), slave device 120 drives DAT line 113 to the low level after a predetermined period elapses (S356).

Host device 100 does not supply the clock to CLK line 111, and shifts a transfer mode of the host device to a high-speed transfer mode faster than a previous mode within a period (within a hatched period in FIG. 2) in which CMD line 112 and DAT line 113 are at the low level (S312). When the host device is a host device compatible with the SD card as the slave device, an example of the high-speed transfer mode is a single data rate (SDR) 104 mode defined by an ultra high speed-1 (UHS-I) standard. In the SDR 104 mode, a bus width used for data transfer is extended from 1 bit to 4 bits. In the SDR 104 mode, a voltage value of the clock and the data signal used for data transfer is 1.8 V. In order to set the voltage value of the clock and the data signal to 1.8 V, controller 106 causes SW 104 to change the power supply to host device I/F 105 to 1.8 V power supplied via regulator 103 instead of 3.3 V power supplied directly from power supply 101.

In the SDR 104 mode, a frequency of the clock used for data transfer is 208 MHz at the maximum.

Slave device 120 also shifts its transfer mode to a high-speed transfer mode (the SDR 104 mode in the present exemplary embodiment) faster than a previous mode in a period (the hatched period in FIG. 2) in which the clock is not supplied to CLK line 111 and CMD line 112 and DAT line 113 are at the low level (S358). At this time, controller 125 causes SW 123 to change power supply to slave device I/F 124 to 1.8 V power supplied via regulator 122 instead of 3.3 V power directly supplied from VDD line 110.

Host device 100 sends the second clock to CLK line 111 at timing t7 after a lapse of a predetermined period (for example, 5 ms) from timing t6 (S314). A frequency of the second clock is 208 MHz or less (second frequency). A voltage value of the second clock is 1.8 V (second voltage value).

As illustrated in FIG. 2, a period from timing t2 to t7 is referred to as a boot initialization mode.

Slave device 120 drives (1.8 V driven by slave in FIG. 2) DAT line 113 to the high level (1.8 V) at timing t8 within a predetermined period (for example, 1 ms) from timing t7 (S360).

Slave device 120 repeatedly transmits a tuning block at a predetermined number of times (for example, 40 times) to host device 100 via DAT line 113 at timing t9 within a predetermined period (for example, 100 ms) from timing t7 (S362).

Host device 100 receives the tuning block and performs tuning (S316). Specifically, host device 100 reads the received tuning block, and checks whether a predefined tuning block can be correctly acquired. When the data is not correctly received, it means that data punching timing (sampling point) with respect to a reference point of each clock is not appropriately set. Therefore, tuning is performed by using a tuning block to be received in the next and subsequent times while the sampling point is being appropriately shifted.

After transmitting tuning blocks at the predetermined number of times, slave device 120 transmits boot data (S364).

Host device 100 receives the boot data (S318). When the tuning is correctly executed in host device 100, host device 100 can correctly receive the boot data.

Upon completion of receiving the boot data (Y in S318), host device 100 drives CMD line 112 to the high level (1.8 V) at timing t10 (S322). As a result, the transmission and reception of the tuning block and the boot data ends (S324). Thereafter, host device 100 initializes back-end module 126, and host device 100 and the like is activated by using boot data. After the activation is completed, data is read and written using a data block between host device 100 and slave device 120.

When not correctly receiving the boot data (N in S318), host device 100 performs initialization in a normal mode (S320).

When confirming that CMD line 112 is driven to the high level (Y in S366), slave device 120 ends the transmission and reception of the boot data (S370).

Otherwise (N in S366), slave device 120 does not particularly operate (S368).

In FIG. 2, a period during timing t7 through t10 is referred to as a boot mode.

3. Details of Transmission and Reception of Tuning Block

3.1. Transmission and Reception of Tuning Block Using Prior Art

Hereinafter, transmission and reception of a tuning block (hereinafter, referred to as tuning block transfer) without using a command based on the prior art will be described with reference to FIGS. 4 and 5.

Figure 4:
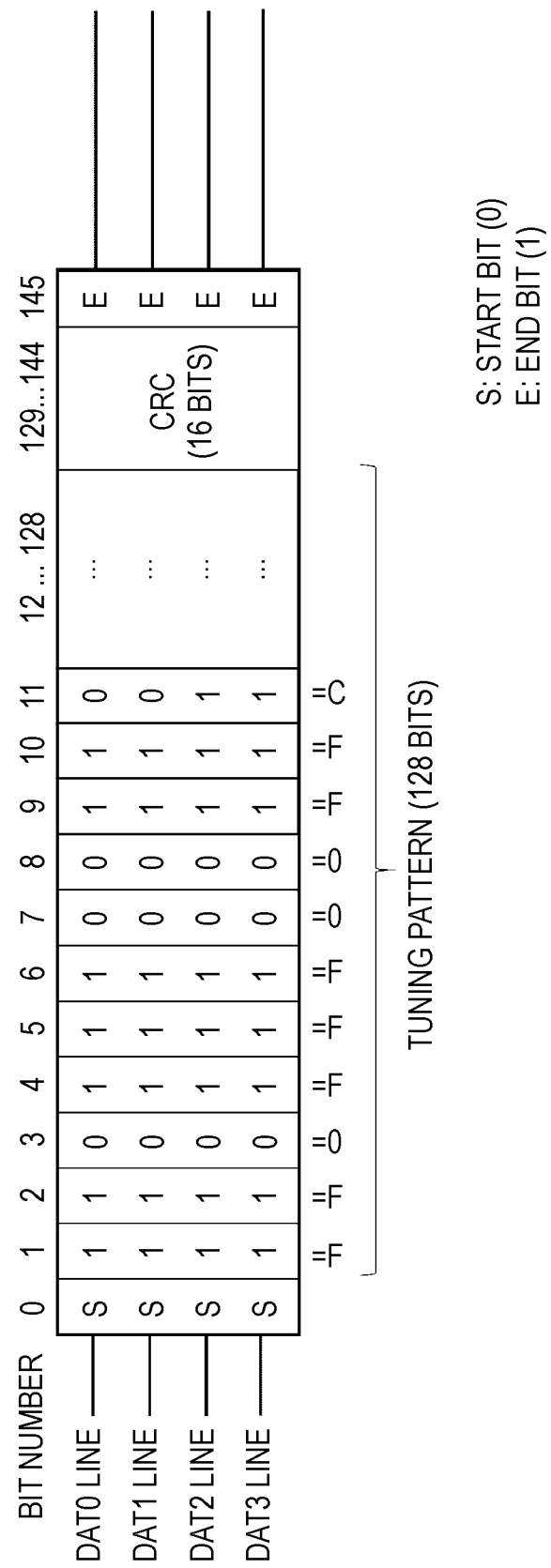
FIG. 4 is a diagram illustrating a tuning block.

FIG. 4 is a diagram illustrating a detailed configuration of a tuning block.

As illustrated in FIG. 4, the tuning block is a kind of data transmitted from slave device 120 to host device 100 by using four signal lines (collectively referred to as DAT line 113) including DAT0 line 113a, DAT1 line 113b, DAT2 line 113c, and DAT3 line 113d. The tuning block has 146 bits in total including a start bit having a length of 1 bit, a tuning pattern having a length of 128 bits, a cyclic redundancy check (CRC) having a length of 16 bits, and an end bit having a length of 1 bit for each of DAT0 line 113a through DAT3 line 113d. In FIG. 4, the start bit and the end bit are denoted as S and E, respectively, but the numerical values are "0" and "1", respectively.

During a period before and after slave device 120 transmits the tuning block, slave device 120 drives DAT line 113 to the high level. Therefore, during this period, host device 100 detects "1" in all the DAT lines.

When host device 100 detects "0" the start bit for all the DAT lines after a predetermined period "1" in all the signal lines of DAT line 113, host device 100 determines that the tuning block has been received. Then, after counting 146 clocks corresponding to the tuning block length, when "1" is detected in all the DAT lines as an end bit, host device 100 determines that the reception of the tuning block is completed.

The tuning pattern having a length of 128 bits according to the present exemplary embodiment is as follows, and is arranged in ascending order of bit number from upper left to lower right (expressed by hexadecimal numbers).

```
FF0FFF00 FFCCC3CC C33CCCFF FEFFFEEF
FFDFFFDD FFFBFFFB BFFF7FFF 77F7BDEF
FFF0FFF0 0FFCCC3C CC33CCCF FFEFFFEE
FFFDFFFD DFFFBFFF BBFFF7FF F77F7BDE
```

The tuning pattern is an example, and other patterns may be used.

Figure 5:
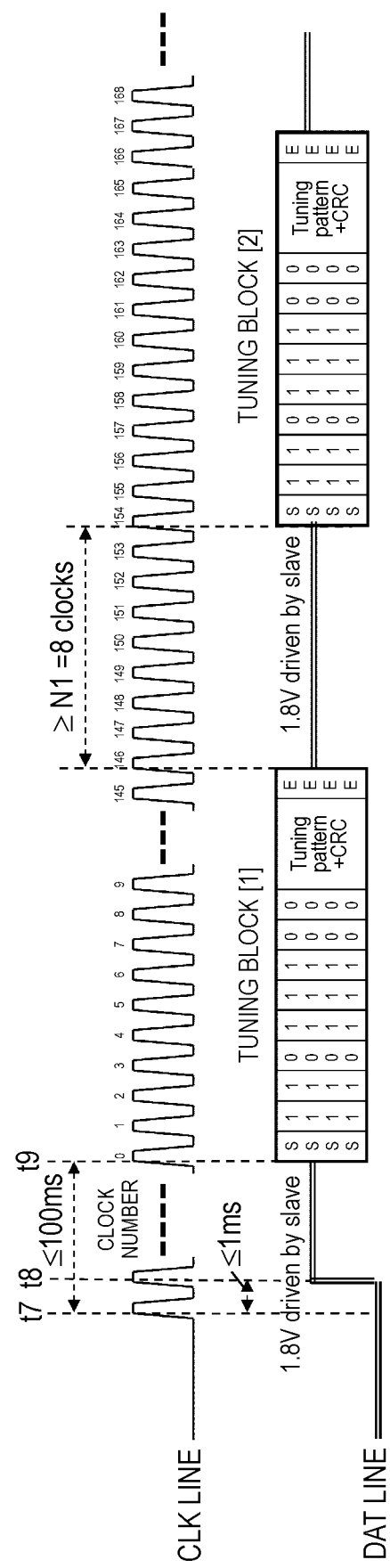
FIG. 5 is a schematic diagram illustrating timing of transmission and reception of the tuning block in a case where the conventional technique is applied.

FIG. 5 is a schematic diagram illustrating details of timing during transmission of the tuning block at a plurality of times after timing t7 in FIG. 2. As described above, slave device 120 drives the DAT line to the high level at timing t8 within a predetermined time (1 ms) after host device 100 starts to send out the second clock at timing t7. Slave device 120 transmits the first tuning block (described as tuning block [1] in FIG. 5) at timing t9 within a predetermined time (100 ms) after t7. In FIG. 5, for convenience, the timing will be described by using clock numbers attached to the respective clocks after timing t9.

Slave device 120 transmits a next tuning block [2] at least a predetermined clock period N1 (8 clocks in the present exemplary embodiment) apart from a next clock (clock number 146) where the transmission of the end bit of the tuning block [1] has been completed. The predetermined clock period N1 is defined as an interval to be provided between a previous data block and a next data block when slave device 120 continuously transmits the data block after the activation is completed, and is referred to as the number of clocks between the data blocks.

After repeating the above operation at a predetermined number of times (40 times in the present exemplary embodiment), slave device 120 continues to transmit boot data.

At this time, the operation expected in host device 100 is to detect that the start bit, that is, "0" is detected on all the four signal lines of DAT line 113 at the timing of clock number 0, and detect that the tuning block [1] is received. The operation is to detect that the end bit, that is, "1" is detected at the timing of clock number 145, and detect that the reception of the tuning block [1] is completed. The operation is then to correctly detect the start bit and the end bit of the tuning block repeatedly transmitted from slave device 120, and to recognize reception of a total of 40 tuning blocks.

However, since the tuning is not completed at timing t9 immediately after the data transfer system of the present exemplary embodiment is activated, an appropriate sampling point is not determined. Further, since a data transfer delay may occur for each DAT line, for example, not all data of the DAT lines can be detected as "0" in clock number 0. In this case, host device 100 cannot correctly recognize the tuning block [1] transmitted from slave device 120 as a tuning block.

Likewise, when host device 100 cannot correctly recognize the tuning blocks after the tuning block [2], host device receives the boot data without performing tuning, and thus cannot achieve the original purpose of correctly acquiring the boot data.

Even if the reception of the tuning block [1] can be detected correctly by chance, a result of reading the tuning pattern in the tuning block [1] does not necessarily match a predetermined tuning pattern retained in advance in host device 100. This means that the sampling point during the reading of the tuning block [1] is not appropriate, and the sampling point needs to be adjusted by using the tuning block to be received later.

However, even if the sampling point is adjusted, the start bit of the subsequent tuning block cannot be necessarily detected correctly, and in this case, further the end bit cannot be correctly detected.

As a result, when host device 100 cannot correctly recognize 40 tuning blocks, and inappropriately recognize a part of boot data subsequent to the 40 tuning blocks. Host device 100 thus cannot correctly receive the boot data.

3.2. Tuning Block Transfer in the Present Disclosure

Figure 6:
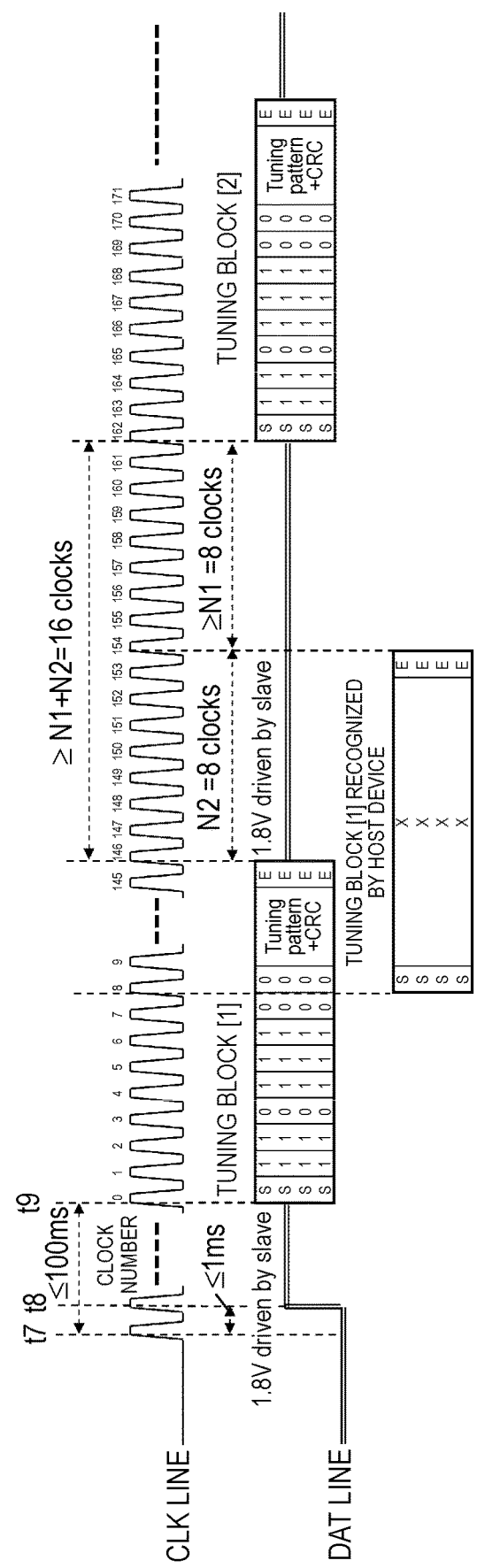
FIG. 6 is a schematic diagram illustrating timing of transmission and reception of the tuning block in the present exemplary embodiment.
Figure 7:
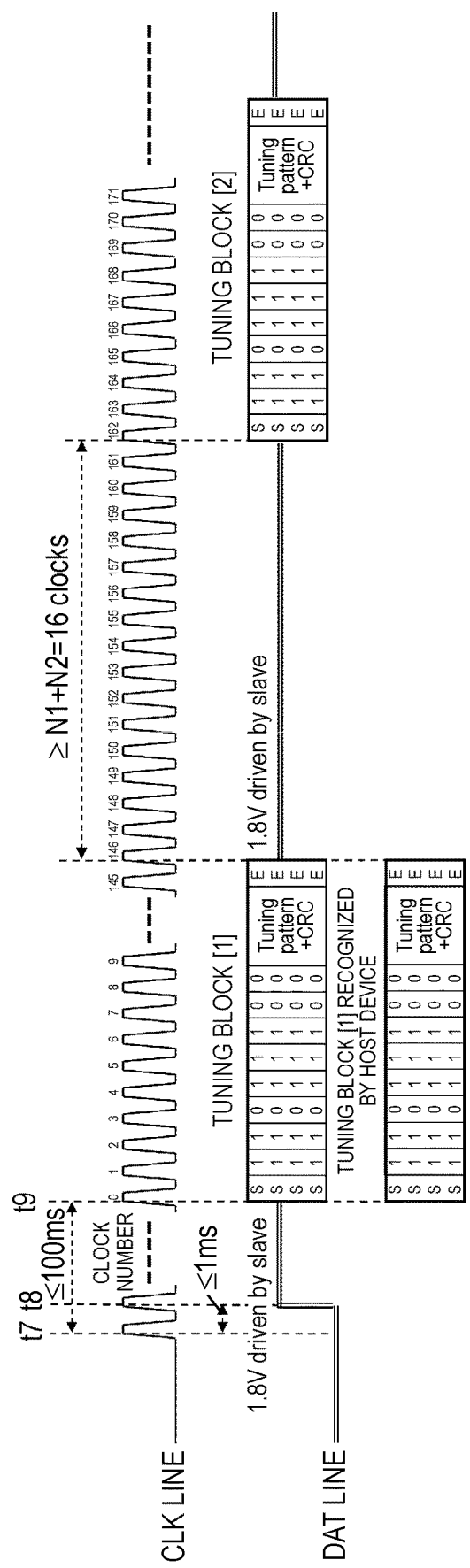
FIG. 7 is a schematic diagram illustrating timing of transmission and reception of another tuning block in the present exemplary embodiment.

With reference to FIGS. 4, 6, and 7, the tuning block transfer of the present disclosure will be described below.

In the tuning pattern in FIG. 4, as for bit numbers 7 and 8, "0" continues in all the DAT lines. Therefore, no matter how much the data is delayed, the start bit can be detected by punching consecutive "00" of bit numbers 7 and 8 regardless of the sampling point at the latest when bit number 8 is received.

FIG. 6 is a timing chart in a case where the host device detects the start bit of the tuning block [1] at the timing of clock number 8.

Host device 100 detects the start bit based on consecutive "0" in bit numbers 7 and 8 at the latest timing up to clock number 8. At this time, host device 100 receives the tuning block [1] with the reception being delayed by up to every 8 clocks from true timing of transmission performed by slave device 120. As described above, when host device 100 receives a start bit, the maximum number of clocks delayed from the true timing is defined as the maximum number of receiving delay clocks, and is represented by N2. The maximum number of receiving delay clocks N2 depends on the tuning pattern and is 8 in the present exemplary embodiment.

After receiving the start bit, host device 100 counts the number of clocks during reception of the tuning block [1], and ends the reception of the tuning block [1] at the timing of clock number 153.

Host device 100 expects that an interval larger than or equal to the number of clocks N1 is provided between the end of reception of a previous block and the start of reception of a next block. In order to satisfy the above, slave device 120 may provide an interval larger than or equal to the number of clocks (16 in the present exemplary embodiment) obtained by adding the maximum number of receiving delay clocks N2 to the number of clocks between data blocks N1 during end of the transmission of a previous tuning block through start of the transmission of a next tuning block.

When host device 100 receives the tuning block with the reception being delayed by 8 clocks from the true start bit, the clock number 153 corresponds to the end bit. At this time, since slave device 120 drives all the DAT lines to the high level, host device 100 can correctly detect the data of the clock number 153 as the end bit ("1").

FIG. 7 is a timing chart in a case where the host device detects the tuning block [1] at the timing of clock number 0.

In this case, host device 100 can detect the true start bit of the tuning block [1] transmitted from slave device 120. Therefore, host device 100 also can detect that the tuning block [1] has ended at the clock number 145.

Further, in the above case, the tuning pattern transmitted from slave device 120 has likelihood of matching the tuning pattern retained in advance in host device 100, and the sampling point is likely to be determined as appropriate.

Note that slave device 120 transmits the next tuning block [2] 16 clocks or more apart from the end of the transmission of the tuning block [1], but receives the next tuning block after 8 clocks or more have elapsed from the end bit of the tuning block [1] from a viewpoint of host device 100, and thus, no problem occurs.

As illustrated in FIG. 6, in a case where host device 100 recognizes that the tuning block has been received after an 8 clock delay from the true start bit, the received tuning pattern does not match the tuning pattern retained in advance in host device 100. In this case, host device 100 may determine that the sampling point is not appropriate, and perform tuning after correcting the sampling point until the next reception of the tuning block.

Further, the numerical values (time, number of clocks, etc.) regarding the timing in the present exemplary embodiment are examples, and other numerical values may be used. The maximum number of receiving delay clocks N2 depends on a data structure of a tuning pattern to be used.

In the present exemplary embodiment, the description has been given on the assumption that the DAT line is driven to the high level at timing t8 and then the (second) clock is continuously supplied. However, it is necessary to retain the received tuning block until host device 100 reads the tuning block and completes determining whether a sampling point is appropriate. However, if host device 100 does not perform any control, host device 100 receives a next tuning pattern, and the previously received tuning block might be overwritten. In this case, host device 100 temporarily stops the supply of a clock after a number of clocks smaller than the number of clocks defined by N1 elapses from reception of the end bit, and thus can prevent the transmission of the next tuning block from slave device 120 (this applies to both cases in FIGS. 6 and 7).

Further, in the description in the present exemplary embodiment, the high-speed bus uses the SDR104 mode, but other modes are similarly applicable. Depending on the mode of the high-speed bus (such as a double data rate (DDR)50 mode), tuning is not necessary. In this case, slave device 120 transmits a tuning block at a plurality of times, but host device 100 discards the received tuning blocks and does not need to perform tuning. Alternatively, when a bus mode requiring no tuning is set, slave device 120 may transmit only boot data without transmitting the tuning block.

In the present exemplary embodiment, the number of tuning blocks transmitted from slave device 120 is set to 40, but another fixed value may be set. Alternatively, host device 100 may record the number of transmitted tuning blocks in a predetermined non-volatile memory area in slave device 120, and slave device 120 may transmit the set number of tuning blocks at next activation.

Alternatively, when tuning is completed before host device 100 completes reception of 40 tuning blocks, host device 100 may drive CMD line 112 to the high level, for example, to causes slave device 120 to stop subsequent transmission of tuning blocks. In this case, for example, host device 100 again drives CMD line 112 to the low level and thus can instruct slave device 120 to transmit boot data.

Figure 8:
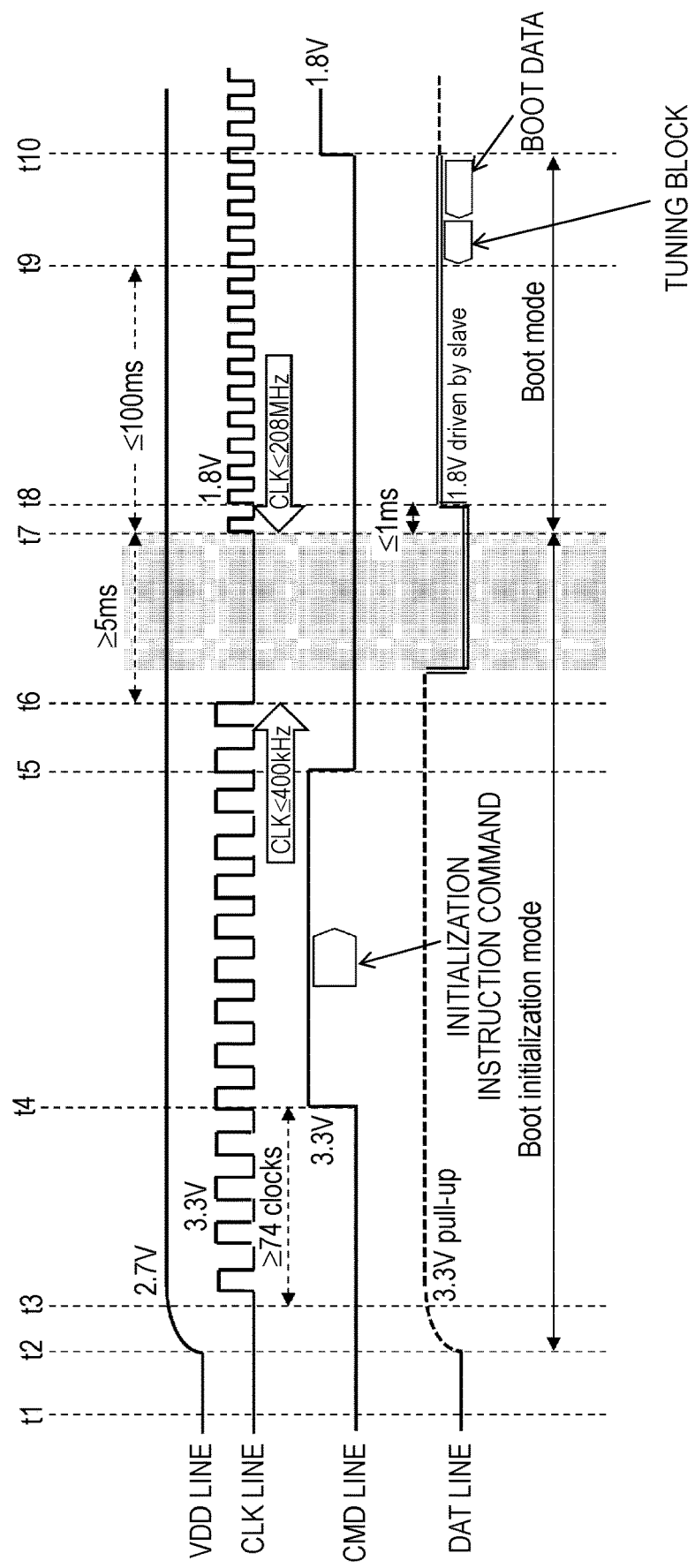
FIG. 8 is a schematic diagram of another timing after power activation in the host device and the slave device.

Further, as illustrated in FIG. 8, the present disclosure is similarly applicable to a case where, for example, host device 100 issues an initialization instruction command to be transmitted to slave device 120 between timings t4 and t5 to instruct transmission of a tuning block and boot data.

4. Conclusion

The exemplary embodiment has been described above as an example of the technique disclosed in the present application. However, the technique of the present disclosure is not limited thereto, and can be also applied to exemplary embodiments in which changes, replacements, additions, omissions, and the like are made.

The host device and slave device of the present disclosure are connected to each other via at least the power supply line, the clock line, the command line, and the data line. The data transfer system of the present disclosure includes the host device and the slave device connected to each other. The host device supplies a power to the slave device via the power supply line after being connected to the slave device, supplies a first clock having a first frequency and a first voltage value to the slave device via the clock line, drives the command line at a high level to a low level, stops the supply of the first clock, supplies a second clock having a second frequency and a second voltage value to the slave device via the clock line in a state where the data line is driven to a low level, performs, when the data line is driven to a high level within a first predetermined period after the supply of the second clock, tuning for adjusting punching timing by using a plurality of tuning blocks transmitted from the slave device via the data line within a second predetermined period at least at an interval of a third predetermined period, receives boot data from the slave device via the data line, and performs activation using the received boot data, thereby acquiring a tuning block while driving a signal line for transmitting and receiving a command to a low level.

Further, in the host device, the slave device, and the data transfer system of the present disclosure, the third predetermined period is defined by a clock period between data blocks at a time of continuously transmitting the data blocks after activation of the slave device and by a clock period defined by a data structure of a block pattern included in the tuning block. As a result, host device 100 can receive a predetermined number of tuning blocks by securely capturing the start bits of the tuning blocks. Therefore, host device 100 can correctly receive data subsequent to the predetermined number of tuning blocks as the boot data.

In the host device, the slave device, and the data transfer system of the present disclosure, the block pattern includes at least a consecutive bit string "00" or "11", and the start bit of the tuning block is determined by detecting a bit string "0" or a bit string "1". As a result, host device 100 can receive a predetermined number of tuning blocks by securely capturing the start bits of the tuning blocks. Therefore, host device 100 can correctly receive data subsequent to the predetermined number of tuning blocks as the boot data.

INDUSTRIAL APPLICABILITY

The present disclosure can be applied to a slave device including an SD card, a compatible host device, and a data transfer system including the host device and the slave device.

REFERENCE MARKS IN THE DRAWINGS

100: host device
101: power supply
102: SoC
103: regulator
104: SW
105: host device I/F
106: controller
110: VDD line
111: CLK line
112: CMD line
113: DAT line
113a: DAT0 line
113b: DAT1 line
113c: DAT2 line
113d: DAT3 line
120: slave device
121: SoC
122: regulator
123: SW
124: slave device I/F
125: controller
126: back-end module

The invention claimed is:

1. A host device that is connected to a slave device via at least a power supply line, a clock line, a command line, and a data line,
wherein the host device:
supplies a power to the slave device via the power supply line after being connected to the slave device,
supplies a first clock having a first frequency and a first voltage value to the slave device via the clock line,
drives the command line at a high level to a low level,
stops the supply of the first clock,
supplies a second clock having a second frequency and a second voltage value to the slave device via the clock line in a state where the data line is driven to a low level,
performs, when the data line is driven to a high level within a first predetermined period after the supply of the second clock, tuning for adjusting punching timing by using a plurality of tuning blocks transmitted from the slave device via the data line within a second predetermined period at an interval of at least a third predetermined period,
receives boot data from the slave device via the data line, and
performs activation using the received boot data, and
wherein the third predetermined period is defined by a clock period between data blocks at a time of continuously transmitting the data blocks after activation of the slave device and by a clock period defined by a data structure of a block pattern included in the plurality of tuning blocks.

2. The host device according to claim 1, wherein
the block pattern includes at least a consecutive bit string "00" or "11", and
the host device determines a start bit of the plurality of tuning blocks by detecting a bit string "0" or a bit string "1".

3. A slave device that is connected to a host device via at least a power supply line, a clock line, a command line, and a data line,
wherein
the slave device is supplied a power from the host device via the power supply line after being connected to the host device,
the slave device is supplied a first clock having a first frequency and a first voltage value from the host device via the clock line, the command line at a high level is driven to a low level, the supply of the first clock is stopped, the slave device is supplied a second clock having a second frequency and a second voltage value from the host device via the clock line in a state where the data line is driven to a low level, the slave device drives the data line to a high level within a first predetermined period after the supply of the second clock, and the slave device transmits a plurality of tuning blocks to the host device via the data line within a second predetermined period at an interval of at least a third predetermined period, and the third predetermined period is defined by a clock period between data blocks at a time of continuously transmitting the data blocks after activation of the slave device and by a clock period defined by a data structure of a block pattern included in the plurality of tuning blocks.

4. The slave device according to claim 3, wherein the block pattern includes at least a consecutive bit string "00" or "11".

5. A data transfer system comprising:
a slave device; and
a host device that is connected to the slave device via at least a power supply line, a clock line, a command line, and a data line, wherein the host device supplies a power to the slave device via the power supply line after being connected to the slave device, the host device supplies a first clock having a first frequency and a first voltage value to the slave device via the clock line, the host device drives the command line at a high level to a low level, the host device stops the supply of the first clock, the host device supplies a second clock having a second frequency and a second voltage value to the slave device via the clock line in a state where the data line is driven to a low level, the slave device drives the data line to a high level within a first predetermined period after the supply of the second clock, and transmits a plurality of tuning blocks to the host device from the slave device via the data line within a second predetermined period at an interval of at least a third predetermined period, the host device performs tuning for adjusting punching timing by using the plurality of tuning blocks received via the data line, the host device receives boot data from the slave device via the data line and performs activation using the received boot data, and the third predetermined period is defined by a clock period between data blocks at a time of continuously transmitting the data blocks after activation of the slave device and by a clock period defined by a data structure of a block pattern included in the plurality of tuning blocks.

6. The data transfer system according to claim 5, wherein
the block pattern includes at least a consecutive bit string "00" or "11", and the host device determines a start bit of the plurality of tuning blocks by detecting a bit string "0" or a bit string "1".

* * * * *